United States Patent
Oshita (10) Patent No.: US 9,733,775 B2
(45) Date of Patent: Aug. 15, 2017

(54) INFORMATION PROCESSING DEVICE, METHOD OF IDENTIFYING OPERATION OF FINGERTIP, AND PROGRAM

(71) Applicant: ALPS ELECTRIC CO., LTD., Tokyo (JP)

(72) Inventor: Kazuhito Oshita, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 118 days.

(21) Appl. No.: 14/727,515

(22) Filed: Jun. 1, 2015

(65) Prior Publication Data
US 2016/0054830 A1    Feb. 25, 2016

(30) Foreign Application Priority Data
Aug. 20, 2014   (JP) ................. 2014-167310

(51) Int. Cl.
| | |
|---|---|
| *G06F 3/038* | (2013.01) |
| *G06F 3/041* | (2006.01) |
| *G06F 3/0485* | (2013.01) |
| *G06F 3/044* | (2006.01) |
| *G06F 3/0488* | (2013.01) |
| *G06F 3/0354* | (2013.01) |

(52) U.S. Cl.
CPC .............. *G06F 3/044* (2013.01); *G06F 3/038* (2013.01); *G06F 3/03547* (2013.01); *G06F 3/0416* (2013.01); *G06F 3/0418* (2013.01); *G06F 3/0485* (2013.01); *G06F 3/04883* (2013.01); *G06F 2203/04104* (2013.01); *G06F 2203/04108* (2013.01); *G06F 2203/04808* (2013.01)

(58) Field of Classification Search
CPC ...... G06F 3/038; G06F 3/0416; G06F 3/0418; G06F 3/0485; G06F 3/044; G06F 2203/04108; G06F 3/04883; G06F 3/03547; G06F 2203/04104
See application file for complete search history.

(56) References Cited

U.S. PATENT DOCUMENTS

| | | | |
|---|---|---|---|
| 2009/0095540 A1 | 4/2009 | Zachut et al. | |
| 2012/0154313 A1* | 6/2012 | Au ...................... | G06F 3/04883 345/173 |
| 2013/0234957 A1* | 9/2013 | Shirato ................. | G06F 3/0416 345/173 |
| 2013/0271430 A1* | 10/2013 | Nakamura .......... | G06F 3/04883 345/178 |
| 2014/0104225 A1* | 4/2014 | Davidson ............... | G06F 3/044 345/174 |

(Continued)

FOREIGN PATENT DOCUMENTS

JP       2011-501261       1/2011

*Primary Examiner* — Charles Hicks
(74) *Attorney, Agent, or Firm* — Beyer Law Group LLP (57) ABSTRACT

When positions of three or more fingers are specified in a sensor unit, it is determined in a determination unit whether a non-fingertip is included in a group consisting of three or more fingers based on a relative position relationship among the three or more fingers. Also, when it is determined that the non-fingertip is included in the group consisting of the three or more fingers, an operation of one true fingertip included in the group consisting of the three or more fingers is identified by an operation identification unit.

17 Claims, 6 Drawing Sheets

(56) References Cited

U.S. PATENT DOCUMENTS

| | | | |
|---|---|---|---|
| 2014/0152624 A1* | 6/2014 | Piot | G06F 3/042 |
| | | | 345/175 |
| 2014/0298266 A1* | 10/2014 | Lapp | G06F 3/04883 |
| | | | 715/835 |
| 2015/0338991 A1* | 11/2015 | Westerman | G06F 3/044 |
| | | | 345/178 |

* cited by examiner

INFORMATION PROCESSING DEVICE, METHOD OF IDENTIFYING OPERATION OF FINGERTIP, AND PROGRAM

CLAIM OF PRIORITY

This application claims benefit of Japanese Patent Application No. 2014-167310 filed on Aug. 20, 2014, which is hereby incorporated by reference.

BACKGROUND OF THE INVENTION

1. Field of the Invention

The present invention relates to an information processing device, a method of identifying an operation of a fingertip, and a program that identify an operation of a fingertip in contact with or in proximity to an operation surface based on an output of a sensor such as a touch pad that detects contact or proximity of an object in a plurality of positions on the operation surface.

2. Description of the Related Art

An input device such as a touch pad or a touch panel including a sensor that detects a contact position of an object, such as a finger or a pen, has been widespread as a man-machine interface of an information device, such as a notebook type PC, a tablet terminal, or a smartphone. Further, in recent years, in this type of input device, input devices corresponding to "multi-touch" in which a plurality of contact places can be detected have increased. In an input device using a multi-touch scheme, since an operation using one finger and an operation using a plurality of fingers can be identified, a variation of an input operation increases, and convenience improves in comparison with a case in which an input device is limited to single touch.

A multi-touch digitizer system that detects a contact position of a finger or the like using a two-dimensional sensor matrix that detects a change in capacitance between conductive lines orthogonal in a lattice form is described in Japanese Unexamined Patent Application Publication No. 2011-501261.

Incidentally, in an input device using a multi-touch scheme, when an operation is performed with one finger, other portions of a hand unintentionally come into contact with or are in proximity to a sensor, and an operation of a plurality of fingers may be erroneously recognized.

Japanese Unexamined Patent Application Publication No. 2011-501261 described above discloses a technology for determining that a potential fingertip touch area in proximity to a palm touch area having a great area is ineligible as a true fingertip touch area. Accordingly, when a palm unintentionally comes in contact with the sensor, it is possible to prevent a touch area having a small area that easily appears near the palm touch area from being erroneously determined to be the fingertip touch area.

However, not only the palm having a great area unintentionally come into contact with the sensor. For example, when a touch operation is performed with a tip of an index finger with a middle finger or a ring finger lightly bent, a joint part of the bent middle finger, ring finger, or the like may come into contact with the operation surface. A contact area of this joint part is much smaller than that of the palm. Accordingly, in the technology disclosed in Japanese Unexamined Patent Application Publication No. 2011-501261 described above, the joint part may be misrecognized as a true fingertip touch area instead of being recognized as a palm touch area.

SUMMARY OF THE INVENTION

The present invention provides an information processing device, a method of identifying an operation of a fingertip, and a program capable of appropriately determining whether a non-fingertip is included due to a joint of a finger, or the like unintentionally coming in contact with or being in proximity to an operation surface when information indicating that three or more fingers come in contact with or in proximity to the operation surface is acquired from a sensor.

A first aspect of the present invention relates to an information processing device that identifies an operation of a fingertip coming in contact with or being in proximity to an operation surface based on information according to a detection result of a sensor that detects contact or proximity of an object in a plurality of positions on the operation surface. This information processing device includes a determination unit configured to determine that a non-fingertip is included in a group consisting of three or more fingers based on a relative positional relationship among the three or more fingers when positions of the three or more fingers are specified based on the detection result of the sensor.

According to the information processing device in the first aspect, the determination unit determines that the non-fingertip is included in the group consisting of three or more fingers based on the relative positional relationship among the three or more fingers when positions of the three or more fingers are specified based on the detection result of the sensor. Accordingly, even when an area of three or more objects coming into contact with or being in proximity to the operation surface does not change with a fingertip, it is appropriately determined that a non-fingertip is included in a group consisting of the three or more objects based on a relative positional relationship between the objects.

Preferably, the determination unit determines that the non-fingertip is included in a group consisting of three or more fingers based on a size of a variation of a distance between adjacent fingers among the three or more fingers of which the positions are specified based on the detection result of the sensor. For example, the determination unit may calculate a distance between each of the positions of the three or more fingers and the position of the other finger based on the specified positions of the three or more fingers, and determine that the non-fingertip is included in the group consisting of the three or more fingers when an absolute value of a difference between one distance and the other distance that are calculated exceeds a first threshold value.

Accordingly, in an operation of one finger using a fingertip of an index finger or the like, it is possible to appropriately determine a state in which joints of other fingers or the like gathering in a position distant from the fingertip unintentionally come into contact with or are in proximity to the operation surface.

Preferably, when at least one of the distances calculated for the three or more fingers exceeds a second threshold value and the absolute value of the difference exceeds the first threshold value, the determination unit determines that the non-fingertip is included in the group consisting of the three or more fingers.

Accordingly, when the positions of the three or more fingertips are sufficiently close to one another, a state in which the joint of the other finger or the like unintentionally comes in contact with or is in proximity to the operation surface at the time of an operation of one finger is not determined, and thus, the determination of the state is accurately performed.

Preferably, the determination unit calculates a predetermined evaluation value indicating a degree of an arrangement pattern of the three or more fingers approximating to a straight line, and determine that the non-fingertip is included in the group consisting of the three or more fingers when the calculated evaluation value deviates from a predetermined range indicating approximation of the arrangement pattern to the straight line.

For example, the determination unit may calculate the evaluation value according to an angle formed by two straight lines passing through the respective positions of the two most distant fingers and the position of the other finger among the three or more fingers.

Accordingly, when the arrangement pattern of the three or more fingertips is approximated to the straight line, a state in which the joint of the other finger or the like unintentionally comes in contact with or is in proximity to the operation surface at the time of an operation of one finger is not determined, and thus, the determination of the state is accurately performed.

Preferably, a coordinate axis having a coordinate value according to a distance from an operator is set in the operation surface. The determination unit may determine that the non-fingertip is included in the group consisting of the three or more fingers when an intersection point of a straight line passing through the positions of the two most distant fingers among the three or more fingers and a straight line passing through the position of the other finger and being parallel to the coordinate axis is distant from the operator relative to the position of the other finger.

When a joint of the other finger or the like unintentionally comes into contact with the operation surface at the time of an operation of one finger, a straight line connecting a contact position of a fingertip of one finger to a contact position of a knuckle or the like most distant from this fingertip is on the side distant from the operator relative to a contact position of another knuckle or the like between the contact positions. Therefore, according to the above-described configuration, a determination of a state in which the joint of the other finger or the like unintentionally comes into contact with the operation surface at the time of an operation of one finger is performed more accurately.

A second aspect of the present invention relates to a method of identifying an operation of a fingertip coming in contact with or being in proximity to an operation surface in a computer that processes information according to a detection result of a sensor that detects contact or proximity of an object in a plurality of positions on the operation surface. This method of identifying an operation of a fingertip includes a first step of determining that a non-fingertip is included in a group consisting of three or more fingers based on a relative positional relationship among the three or more fingers when positions of the three or more fingers are specified based on the detection result of the sensor.

Preferably, the first step includes determining that the non-fingertip is included in a group consisting of the three or more fingers based on a size of a variation of a distance between adjacent fingers among the three or more fingers of which the positions are specified based on the detection result of the sensor. For example, the first step may include calculating a distance between each of the positions of the three or more fingers and the position of the other finger based on the specified positions of the three or more fingers, and determining that the non-fingertip is included in the group consisting of the three or more fingers when an absolute value of a difference between one distance and the other distance that are calculated exceeds a first threshold value.

Preferably, the first step includes determining that the non-fingertip is included in the group consisting of the three or more fingers when at least one of the distances calculated for the three or more fingers exceeds a second threshold value and the absolute value of the difference exceeds the first threshold value.

Preferably, the first step includes calculating a predetermined evaluation value indicating a degree of an arrangement pattern of the three or more fingers approximating to a straight line, and determining that the non-fingertip is included in the group consisting of the three or more fingers when the calculated evaluation value deviates from a predetermined range indicating approximation of the arrangement pattern to the straight line.

For example, the first step may include calculating the evaluation value according to an angle formed by two straight lines passing through the respective positions of the two most distant fingers and the position of the other finger among the three or more fingers.

Preferably, a coordinate axis having a coordinate value according to a distance from an operator is set in the operation surface. The first step may include determining that the non-fingertip is included in the group consisting of the three or more fingers when an intersection point of a straight line passing through the positions of the two most distant fingers among the three or more fingers and a straight line passing through the position of the other finger and being parallel to the coordinate axis is distant from the operator relative to the position of the other finger.

A third aspect of the present invention is a program for causing a computer to execute the method of identifying an operation of a fingertip.

According to the present invention, when the information indicating that three or more fingers come in contact with or in proximity to the operation surface is acquired from the sensor, it is possible to appropriately determine whether the non-fingertip is included due to a joint of the finger or the like unintentionally coming in contact with or being in proximity to the operation surface based on the relative positional relationship among the three or more fingers.

BRIEF DESCRIPTION OF THE DRAWINGS

FIGS. 2A to 2C are diagrams illustrating a state in which one or more fingers come into contact with an operation surface.

DESCRIPTION OF THE PREFERRED EMBODIMENTS

Figure 1:
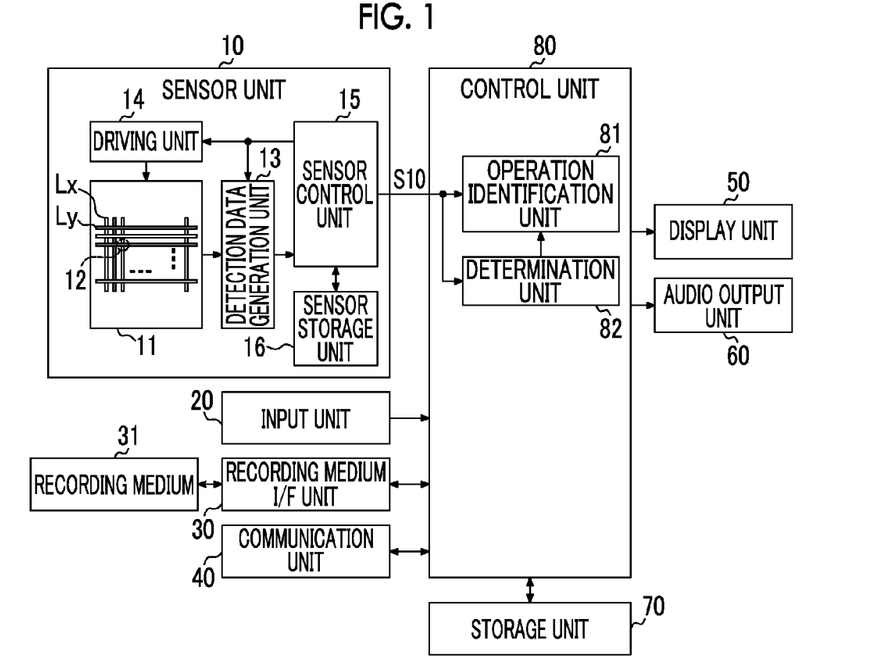
FIG. 1 is a diagram illustrating an example of a configuration of an information processing device according to an embodiment of the present invention.

FIG. 1 is a diagram illustrating an example of a configuration of an information processing device according to an embodiment of the present invention. The information processing device illustrated in FIG. 1 includes a sensor unit 10, an input unit 20, a recording medium interface unit 30, a communication unit 40, a display unit 50, an audio output unit 60, a storage unit 70, and a control unit 80. This information processing device is an electronic device including a man-machine interface, and includes, for example, a notebook type computer, a smartphone, a tablet computer, or the like.

Sensor Unit 10

The sensor unit 10 is an input device (human-machine interface) that detects contact or proximity of an object such as a finger or a pen in a plurality of detection positions distributed on an operation surface. Further, "proximity" in the present specification includes both of proximity in a contact state and proximity in a non-contact state.

For example, the sensor unit 10 includes a sensor 11 in which capacitors (capacitive sensor elements) 12 of which capacitance changes according to proximity of an object are formed in a matrix form, a detection data generation unit 13 that generates detection data according to the capacitance of the capacitor 12, a driving unit 14 that applies a driving voltage to the capacitor 12 of the sensor 11, a sensor control unit 15 that specifies a position in which a finger comes into contact with or is in proximity to the operation surface based on the detection data generated by the detection data generation unit 13, and a sensor storage unit 16.

The sensor 11 includes a plurality of driving electrodes Lx extending in a vertical direction, and a plurality of detection electrodes Ly extending in a horizontal direction. The plurality of driving electrodes Lx are arranged in parallel in the horizontal direction, and the plurality of detection electrodes Ly are arranged in parallel in the vertical direction. The plurality of driving electrodes Lx and the plurality of detection electrodes Ly intersect in a lattice form, and are insulated from each other. The capacitor 12 is formed near an intersection portion of the driving electrode Lx and the detection electrode Ly. Further, in the example of FIG. 1, shapes of the electrodes Lx and Ly are drawn in a strip shape, but may be any other shape (for example, a diamond pattern).

The driving unit 14 is a circuit that applies the driving voltage to the capacitor 12 of the sensor 11. Specifically, the driving unit 14 sequentially selects one driving electrode Lx from among the plurality of driving electrodes Lx under the control of the sensor control unit 15, and periodically changes a potential of the selected driving electrode Lx. A potential of the driving electrode Lx changes in a predetermined range, and thus, the driving voltage applied to the capacitor 12 formed near a crossing point of the driving electrode Lx and the detection electrode Ly changes in a predetermined range, and the capacitor 12 is charged or discharged.

The detection data generation unit 13 generates the detection data according to the charge transferred in each detection electrode Ly when the capacitor 12 is charged or discharged due to application of the driving voltage by the driving unit 14. In other words, the detection data generation unit 13 samples the charge transferred in each detection electrode Ly at a timing synchronized with a periodic change in the driving voltage of the driving unit 14, and generates the detection data according to a result of the sampling.

For example, the detection data generation unit 13 includes a capacitance-to-voltage conversion circuit (CV conversion circuit) that outputs a voltage according to the capacitance of the capacitor 12, and an analog-to-digital conversion circuit (AD conversion circuit) that converts an output signal of the CV conversion circuit into a digital signal and outputs the digital signal as detection data.

The CV conversion circuit samples the charge transferred in the detection electrode Ly under control of the sensor control unit 15 each time the driving voltage of the driving unit 14 periodically changes and the capacitor 12 is charged or discharged. Specifically, each time a positive or negative charge is transferred in the detection electrode Ly, the CV conversion circuit transfers this charge or a charge proportional thereto to a capacitor for reference, and outputs a signal according to a voltage generated in the capacitor for reference. For example, the CV conversion circuit outputs a signal according to an integration value or an average value of a charge periodically transferred in the detection electrode Ly or a charge proportional thereto. The AD conversion circuit converts the output signal of the CV conversion circuit into a digital signal in a predetermined period under control of the sensor control unit 15, and outputs the digital signal as detection data.

The sensor control unit 15 is a circuit that controls an operation of the sensor unit 10 and includes, for example, a computer that performs a process according to an instruction code of the program stored in the sensor storage unit 16, or a logic circuit that realizes a specific function. The sensor control unit 15 performs a process of generating two-dimensional data indicating a size of the capacitance of the capacitor 12 in each position on an operation surface based on the detection data generated by the detection data generation unit 13, and specifying the position of the finger on the operation surface 17 from the two-dimensional data. The sensor control unit 15 outputs information (position data S10) regarding the specified position of the finger to the control unit 80.

The sensor storage unit 16 stores constant data or variable data used for a process in the sensor control unit 15. When the sensor control unit 15 includes a computer, the sensor storage unit 16 may store a program to be executed in the computer. The sensor storage unit 16 includes, for example, a volatile memory such as a DRAM or an SRAM, or a nonvolatile memory such as a flash memory.

Further, while the sensor unit 10 shown in the above-described example detects proximity of the object based on a change in capacitance (mutual capacitance) generated between the electrodes Lx and Ly, the present invention is not limited thereto and the proximity of the object may be detected using various other schemes. For example, the sensor unit 10 may detect capacitance (self-capacitance) generated between the electrode and a ground due to the approach of the object. In the case of a scheme of detecting the self-capacitance, a driving voltage is applied to the detection electrode. Further, the sensor unit 10 is not limited to a capacitance scheme, and may be, for example, a resistance film scheme or an electromagnetic induction type.

Input Unit 20

The input unit 20 is a device (human-machine interface) for inputting an instruction of the operator, and includes, for example, a mouse, a keyboard, a push button or the like.

Recording Medium Interface Unit 30

The recording medium interface unit 30 is an interface device for accessing an external recording medium 31, and includes, for example, a disc drive device that accesses a disc type recording medium such as a DVD, or a USB interface circuit for accessing a USB memory.

Communication Unit 40

This is a circuit for performing communication based on a predetermined communication scheme with another communication device and has, for example, a function of wireless LAN communication based on Wi-Fi (trademark). The information processing device is able to exchange data with the other device via the communication unit 40.

Display Unit 50

The display unit 50 is a device that displays an image according to a video signal supplied from the control unit 80, and includes, for example, a liquid crystal display or a video signal processing circuit.

Audio Output Unit 60

The audio output unit 60 is a device that outputs sound according to an audio signal supplied from the control unit 80, and includes, for example, a speaker or an audio signal processing circuit.

Storage Unit 70

The storage unit 70 stores constant data that is used for processing of the control unit 80, variable data that is temporarily used in a processing process, or the like. When the control unit 80 includes a computer, the storage unit 70 may store a program executed in the computer. The storage unit 70 includes a nonvolatile memory such as a FRASH memory, a volatile memory such as a DRAM or an SRAM, a read-only memory (ROM), a hard disk, or the like.

Control Unit 80

The control unit 80 is a circuit that controls a general operation of the information processing device and includes, for example, a computer that executes a process according to instruction codes of a program. This program is stored in, for example, the hard disk or the nonvolatile memory of the storage unit 70, a computer-readable, non-transitory recording medium 31 (a recording disk, USB memory, or the like). When the program is to be executed, the program is appropriately loaded to a DRAM of the storage unit 70 or the like, and instruction codes in the program are sequentially read and executed by a microprocessor of the computer. Further, at least some of the functions of the control unit 80 can be realized by a dedicated logic circuit (for example, ASIC).

The control unit 80 is a block that performs a process regarding information (position data S10 indicating a position of a finger coming in contact with or being in proximity to the operation surface 17) acquired in the sensor unit 10, and includes an operation identification unit 81, and a determination unit 82.

The operation identification unit 81 identifies an operation of the fingertip in contact with or in proximity to the operation surface 17 based on the position of the finger specified based on the detection result of the sensor unit 10 and a determination result of the determination unit 82. That is, the operation identification unit 81 identifies the operations of one or more fingertips in contact with or in proximity to the operation surface 17 based on the position data S10 indicating the positions of the one or more fingers specified in the sensor unit 10 and the determination result for the non-fingertip in the determination unit 82. For example, the operation identification unit 81 identifies an operation (for example, tap, double tap, drag, pan, flick, swipe, pinch in, or pinch out) of the fingertip on the operation surface 17 based on a result of calculating the number of fingertips in contact with or in proximity to the operation surface 17, a contact time of each fingertip, a movement direction of each fingertip, a movement speed of each fingertip, or the like.

When positions of the three or more fingers are specified in the sensor unit 10, the determination unit 82 determines that a non-fingertip (which is not a fingertip, such as a joint part of the finger) is included in the group consisting of the three or more fingers based on a relative positional relationship among the three or more specified fingers.

Figure 2A:
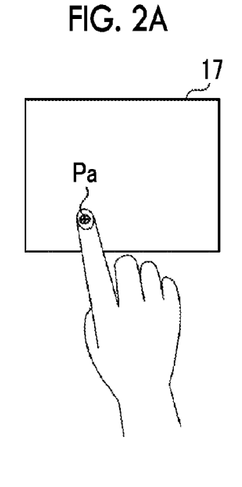
FIG. 2A illustrates a state in which one fingertip comes into contact.
Figure 2B:
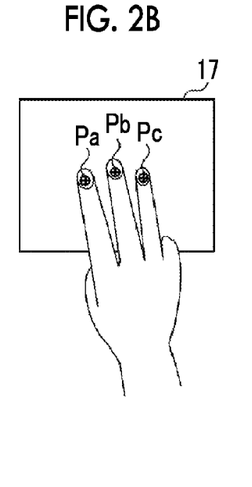
FIG. 2B illustrates a state in which three fingertips come into contact.
Figure 2C:
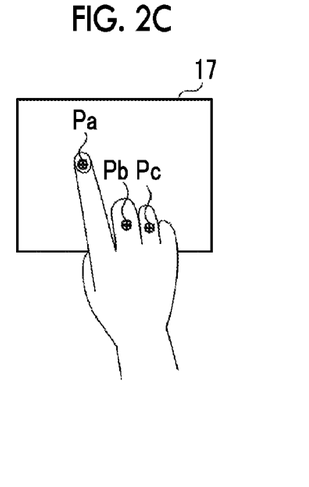
FIG. 2C illustrates a state in which one fingertip and two non-fingertips (a joint part of a finger) come into contact.

FIGS. 2A to 2C are diagrams illustrating a state in which one or more fingers come into contact with the operation surface 17. FIG. 2A illustrates a state in which one fingertip comes into contact, and FIG. 2B illustrates a state in which three fingertips come into contact. On the other hand, FIG. 2C illustrates a state in which one fingertip and two non-fingertips (joint parts of a middle finger and a ring finger) come into contact.

The sensor unit 10 regards both of the states of FIGS. 2B and 2C as three fingers coming in contact with or being in proximity to the operation surface 17, and outputs position data S10 indicating a position of each finger. The determination unit 82 determines a state in which the non-fingertips are included as illustrated in FIG. 2C according to a relative positional relationship between the respective fingers.

For example, the determination unit 82 performs a determination as to whether the non-fingertip is included in the group consisting of the three or more fingers based on a size of the variation of a distance between the three or more fingers of which the positions are specified by a detection result of the sensor. Specifically, the determination unit 82 calculates a distance (which may be hereinafter referred to as a "finger distance D") between the position of each of the three or more fingers and the position of the other finger based on the positions (for example, "Pa", "Pb," and "Pc" in FIG. 5 to be described below) of the three or more fingers specified in the sensor unit 10. When an absolute value of a difference between the one finger distance D and the other finger distance D that have been calculated exceeds a first threshold value TH1 (when the one finger is more greatly spaced than the other finger), the determination unit 82 determines that the non-fingertip is included in the group consisting of the three or more fingers.

Further, the determination unit 82 may further determine whether at least one of the finger distances D of the three or more fingers specified in the sensor unit 10 exceeds a second threshold value TH2 (a distance between the most distant fingers exceeds "TH2"). In this case, if at least one of the finger distances D of the three or more fingers exceeds the second threshold value TH2, and the absolute value of the difference between the finger distances D described above exceeds the first threshold value TH1, the determination unit 82 determines that the non-fingertip is included in the group consisting of the three or more fingers.

Further, when at least one of the finger distances D of the three or more fingers specified in the sensor unit 10 exceeds the second threshold value TH2 and the variation of the finger distance D exceeds the first threshold value TH1, the determination unit 82 may calculate a predetermined evaluation value indicating a degree of an arrangement pattern of the three or more fingers (which may also be hereinafter referred to as a "finger arrangement pattern") approximating to a straight line. For example, the determination unit 82 may calculate the evaluation value according to an angle (for example, "θabc" in FIG. 6 to be described) formed by two straight lines passing through respective positions of the two most distant fingers and the position of the other finger among the three or more fingers. In this case, the determination unit 82 determines that the non-fingertip is included in the group consisting of the three or more fingers if the evaluation value deviates from the predetermined range indicating that the finger arrangement pattern approximates to the straight line (that is, the finger arrangement pattern does not have a linear shape).

Further, when at least one of the finger distances D of the three or more fingers specified in the sensor unit 10 exceeds the second threshold value TH2, the absolute value of the difference between the finger distances D exceeds the first threshold value TH1, and the evaluation value of the finger arrangement pattern deviates from the predetermined range indicating the approximation to the straight line, the determination unit 82 may determine whether the non-fingertip is included in the group consisting of the three or more fingers based on the relationship between the finger arrangement pattern and the position of the operator.

Specifically, the determination unit 82 further determines a positional relationship for the operator between a straight line (for example, "Lac" in FIG. 7 to be described) passing through the positions of the two most distant fingers and the position (for example, "Pb" in FIG. 7) of the other finger.

In this case, a coordinate axis (for example, a Y axis in FIG. 7) having a coordinate value according to a distance from an operator is set in the operation surface 17. The determination unit 82 determines that the non-fingertip is included in the group consisting of the three or more fingers if an intersection point (for example, "Px" in FIG. 7) of the straight line (for example, "Lac" in FIG. 7) passing through the positions of the two most distant fingers and a straight line (for example, "Lbx" in FIG. 7) passing through the position (for example, "Pb" in FIG. 7) of the other finger and being parallel to the above-described coordinate axis is distant from the operator relative to the position ("Pb" in FIG. 7) of the other finger.

Further, when it is determined in the determination unit 82 that the non-fingertip is included in the group consisting of the three or more fingers specified in the sensor unit 10, the operation identification unit 81 identifies an operation of one true fingertip included in the group consisting of the three or more fingers. For example, the operation identification unit 81 regards the finger having a greater finger distance D relative to the other fingers as one true fingertip included in the group consisting of the three or more fingers.

Figure 3:
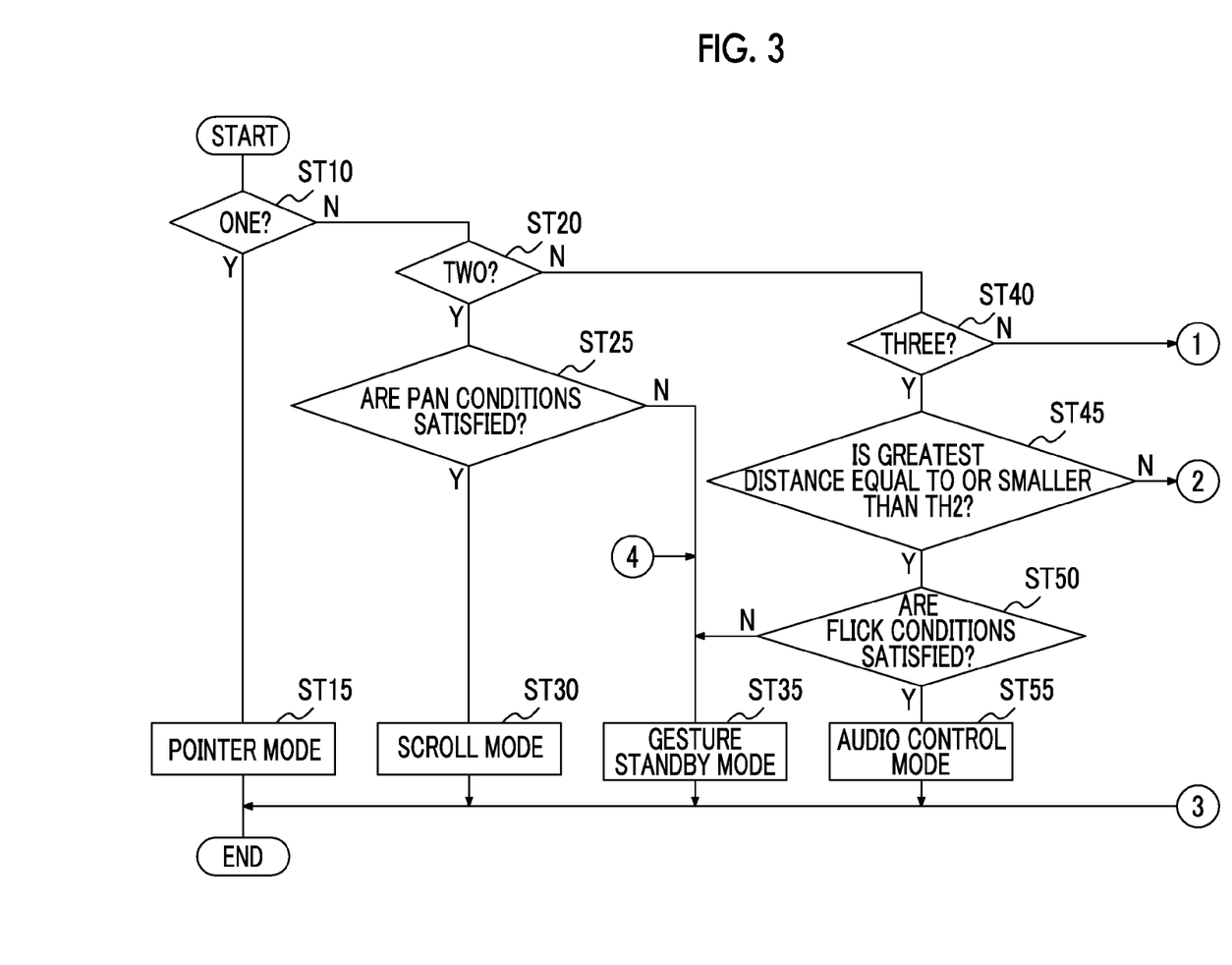
FIG. 3 is a first flowchart illustrating an operation of identifying an operation of a fingertip in the information processing device illustrated in FIG. 1.
Figure 4:
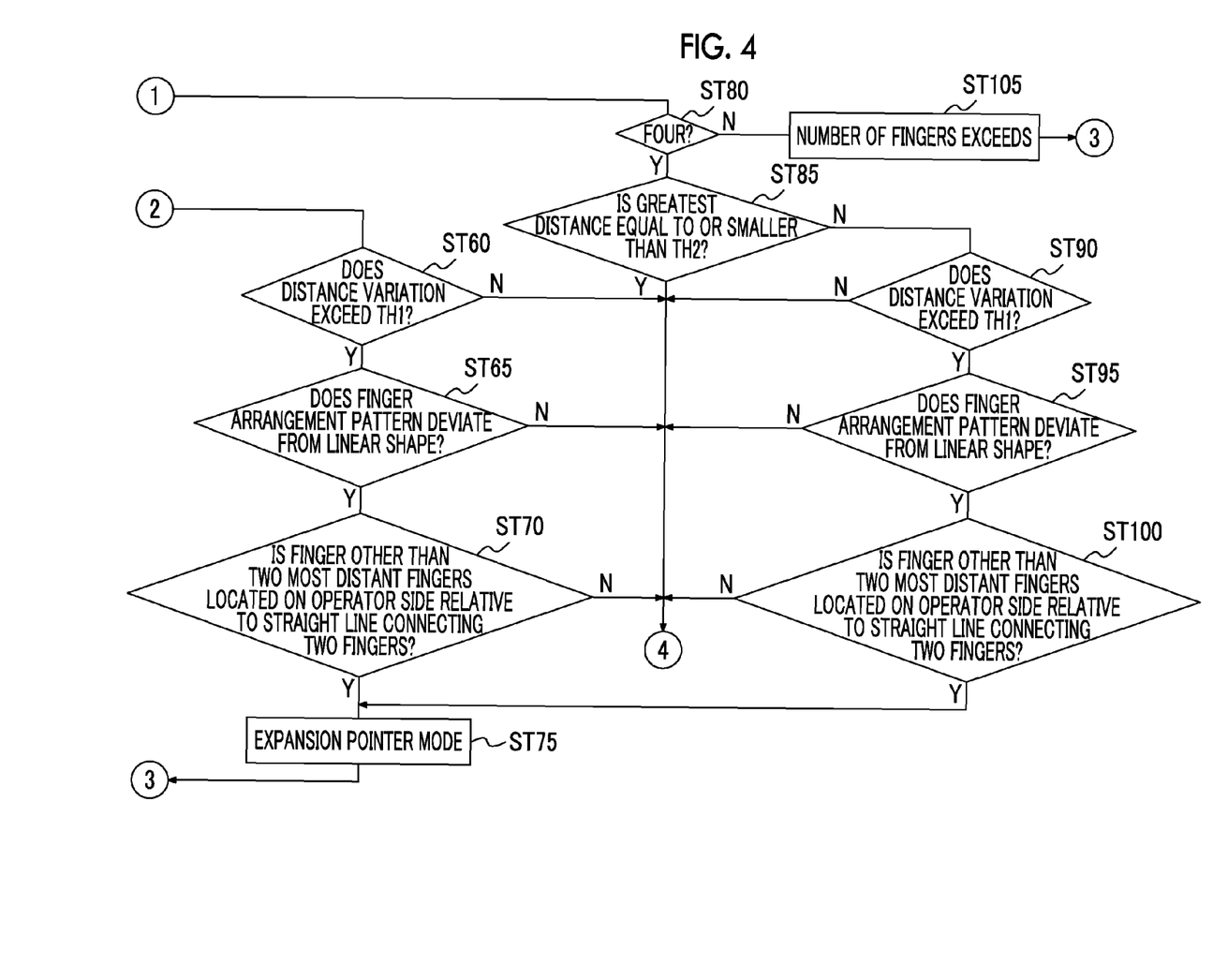
FIG. 4 is a second flowchart illustrating an operation of identifying an operation of a fingertip in the information processing device illustrated in FIG. 1.

Here, an operation of identifying an operation of the fingertip based on the position data S10 of the finger output from the sensor unit 10 in the information processing device illustrated in FIG. 1 having the above-described configuration will be described. FIGS. 3 and 4 are flowcharts illustrating the operation of identifying the operation of the fingertip in the information processing device.

When the position data S10 indicating that one finger is specified in the sensor unit 10 is acquired (ST10), the operation identification unit 81 proceeds to a "pointer mode" in which an operation for one fingertip is identified (ST15).

When the position data S10 indicating that two fingers are specified in the sensor unit 10 is acquired (ST20), the operation identification unit 81 proceeds to a "scroll mode" in which an operation of two fingertips is identified to be an operation of scrolling a screen when the two fingers satisfy predetermined pan conditions (for example, conditions indicating that the two fingers are moving in a certain direction at a certain finger distance D) (ST25 and ST30).

When it is determined that the two fingers do not satisfy the predetermined pan conditions in step ST25, the operation identification unit 81 proceeds to a "gesture standby mode" in which any further gesture given by two fingers is waited for (ST35).

When the position data S10 indicating that three fingers are specified in the sensor unit 10 is acquired (ST40), the determination unit 82 calculates respective finger distances D of the three fingers, and determines whether the greatest finger distance among the calculated finger distances D is smaller than the second threshold value TH2 (ST45).

Figure 5:
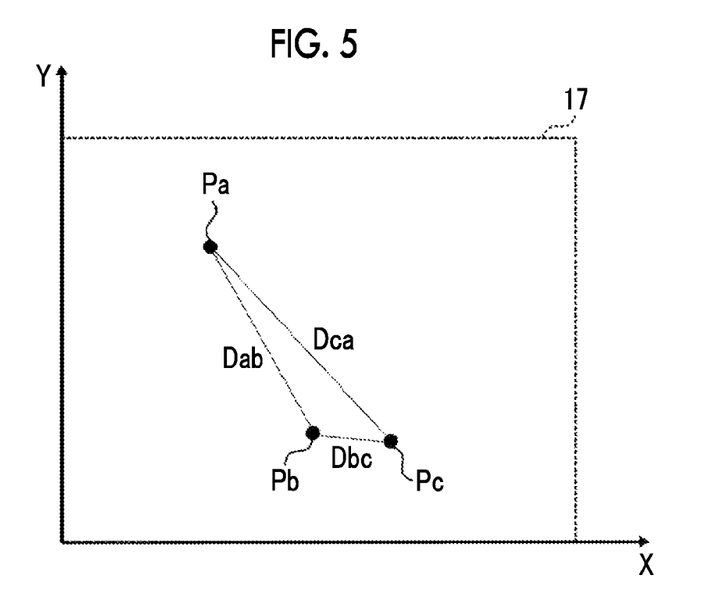
FIG. 5 is a diagram illustrating finger distances of three fingers.

FIG. 5 is a diagram illustrating the finger distances D between the three fingers. "Pa," "Pb," and "Pc" in FIG. 5 indicate the positions of the fingers on the operation surface 17 specified by the sensor unit 10. In FIG. 5, a distance between the positions Pa and Pb is a finger distance Dab, a distance between the positions Pb and Pc is a finger distance Dbc, and a distance between the positions Pc and Pa is a finger distance Dca.

The determination unit 82 compares each of these finger distances (Dab, Dbc, and Dca) with the second threshold value TH2 in step ST45. When at least one finger distance exceeds the second threshold value TH2 as a result of the comparison, the determination unit 82 proceeds to step ST60 since the non-fingertip is likely to be included in the three fingers Pa, Pb, and Pc specified by the sensor unit 10. On the other hand, when all the finger distances are smaller than the second threshold value TH2 (that is, when the three fingers gather in a relatively small range), the determination unit 82 determines that the non-fingertip is unlikely to be included in the three fingers Pa, Pb, and Pc, and proceeds to step ST50.

In step ST50, the operation identification unit 81 determines whether the three fingers satisfy predetermined flick conditions. For example, when the three fingers move relatively fast in one direction at a constant finger distance, the operation identification unit 81 determines that the predetermined flick conditions are satisfied. When the three fingers satisfy the predetermined flick conditions, the operation identification unit 81 proceeds to an "audio control mode" in which control regarding audio (for example, adjustment of a volume) is performed by the flick operation of the three fingertips (ST55). On the other hand, when the three fingers do not satisfy the predetermined flick conditions, the operation identification unit 81 proceeds to a "gesture standby mode" in which any further gesture given by the three fingers is waited for (ST35).

In step ST60, the determination unit 82 calculates a size of the variation for the finger distances Dab, Dbc, and Dca of the three fingers and determines whether the size of the variation exceeds the first threshold value TH1. Specifically, the determination unit 82 calculates an absolute value (|Dab−Dbc|) of a difference between the finger distances Dab and Dbc, an absolute value (|Dbc−Dca|) of a difference between the finger distances Dbc and Dca, and an absolute value (|Dca−Dab|) of a difference between the finger distances Dca and Dab, and compares the calculated absolute values of the differences with the first threshold value TH1. Also, when any one of the calculated absolute values of the differences exceeds the first threshold value TH1 (that is, when the variation of a distance between adjacent fingers, which are fingers greatly distant relative to the other finger, is great), the determination unit 82 proceeds to step ST65 since the non-fingertip is likely to be included in the three fingers Pa, Pb, and Pc. On the other hand, when all the calculated differences are smaller than the first threshold value TH1, the determination unit 82 determines that the non-fingertip is unlikely to be included in the three fingers Pa, Pb, and Pc, and proceeds to the gesture standby mode (ST35).

In step ST65, the determination unit 82 calculates a predetermined evaluation value indicating a degree of the finger arrangement pattern of the three fingers Pa, Pb, and Pc approximating to the straight line, and determines whether the evaluation value is included in a predetermined range indicating that the finger arrangement pattern is close to the straight line.

Figure 6:
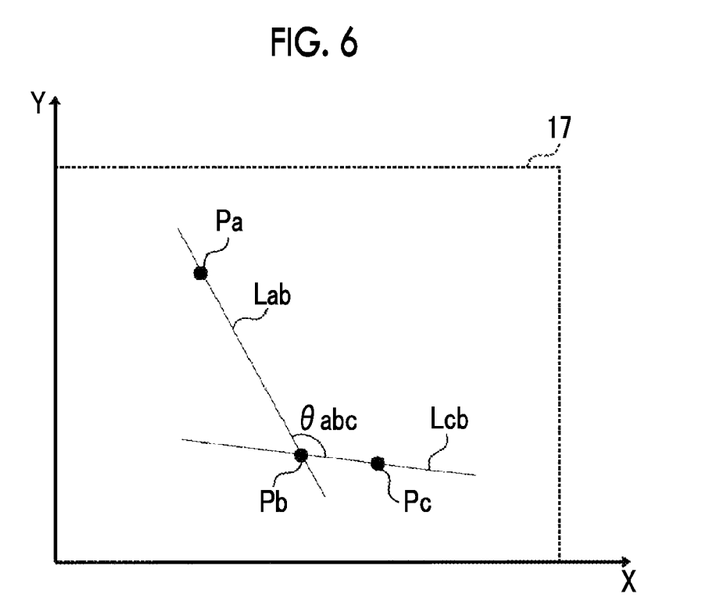
FIG. 6 is a diagram illustrating an evaluation value indicating a degree of a finger arrangement pattern of three fingers approximating to a straight line.

FIG. 6 is a diagram illustrating an evaluation value indicating the degree of the finger arrangement pattern of the three fingers approximating to the straight line. As illustrated in FIG. 6, when the three fingers Pa, Pb, and Pc are specified, the determination unit 82 calculates an evaluation value according to an angle θabc formed by two straight lines Lab and Lcb passing through respective positions Pa and Pc of two most distant fingers and a position Pb of the other finger among the three fingers Pa, Pb, and Pc. When the three fingers Pa, Pb, and Pc are arranged side by side on the straight line, the angle θabc becomes 180°.

For example, the determination unit 82 calculates a difference (|180−θabc|) between the angle θabc and 180° as the evaluation value. In this case, when the evaluation value is greater than a predetermined threshold value (angle), the determination unit 82 determines that the finger arrangement pattern of the three fingers Pa, Pb, and Pc deviates from the linear pattern. When the finger arrangement pattern deviates from the linear pattern, the non-fingertip is likely to be included in the three fingers Pa, Pb, and Pc, and thus, the determination unit 82 proceeds to step ST70. On the other hand, when the evaluation value is smaller than the threshold value, the determination unit 82 determines that the non-fingertip is unlikely to be included in the three fingers Pa, Pb, and Pc, and proceeds to the gesture standby mode (ST35).

In step ST70, the determination unit 82 determines whether the non-fingertip is included in the three fingers based on the arrangement pattern of the three fingers Pa, Pb, and Pc and the position relative to the operation surface 17 of the operator.

When a joint of the other finger (a middle finger or a ring finger), or the like unintentionally comes in contact with the operation surface 17 when an operation is performed with one finger (index finger) (FIG. 2C), a straight line connecting a contact position Pa of the fingertip intending the operation to a contact position Pc of a knuckle or the like most distant from this fingertip is on the side more distant from the operator than a contact position Pb of the other knuckle or the like between these contact positions Pa and Pc. The determination unit 82 determines whether a knuckle or the like unintentionally comes in contact with the operation surface 17 at the time of an operation of one finger, using the above-described properties caused by natural shapes of fingers.

Figure 7:
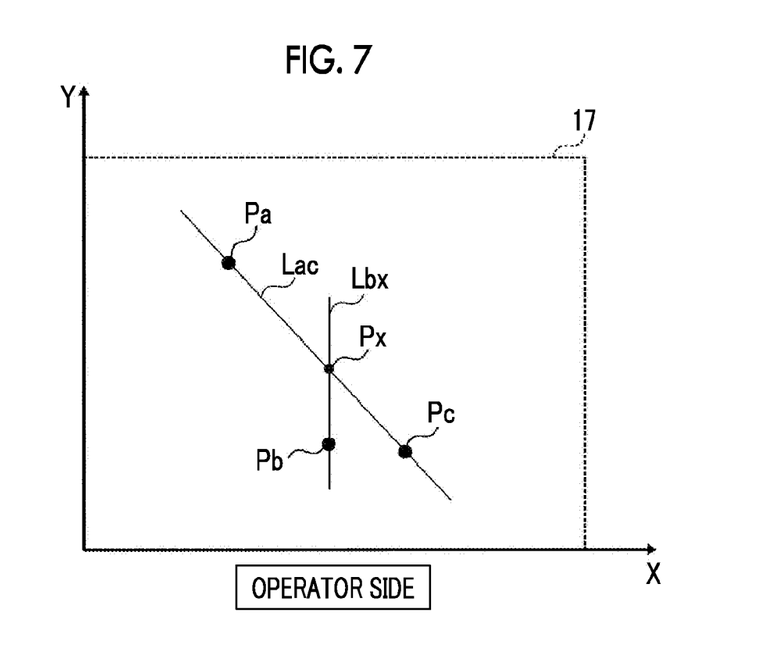
FIG. 7 is a diagram illustrating a method of determining whether there is a non-fingertip from a relationship between a finger arrangement pattern of three fingers and a position of an operator.

FIG. 7 is a diagram illustrating a method of determining whether a non-fingertip is included in three fingers based on a finger arrangement pattern of the three fingers and a position of an operator.

In an example of FIG. 7, the operator is located at one side indicated as an "operator side" in a rectangular operation surface 17. A coordinate axis Y is set so that a coordinate value thereof indicates a distance from the operator. A straight line Lac is a straight line passing through positions Pa and Pc of two most distant fingers among the three fingers Pa, Pb, and Pc. Further, a straight line Lbx is a straight line passing through the position Pb of one finger other than the two most distant fingers and being parallel to the Y axis. An intersection point Px is an intersection point of this straight line Lac and the straight line Lbx. If the intersection point Px is in a position distant from the operator relative to the position Pb of one finger other than the two most distant fingers, the determination unit 82 determines that the non-fingertip is included in a group consisting of the three fingers. On the other hand, when the intersection point Px is in a position close to the operator relative to the position Pb of the finger, the determination unit 82 determines that the non-fingertip is unlikely to be included in the group consisting of the three fingers Pa, Pb, and Pc, and proceeds to the gesture standby mode (ST35).

When the determination unit 82 determines that the non-fingertip is included in the three fingers in step ST70, the operation identification unit 81 proceeds to an "expansion pointer mode" in which an operation of one fingertip is identified (ST75). In the expansion pointer mode, the operation identification unit 81 identifies the operation of one true fingertip included in the three fingers, as in the pointer mode of step ST15. For example, the operation identification unit 81 regards a finger having a greatest finger distance D with respect to the other fingers (the fingertip in the position Pa in the example of FIGS. 5 to 7) as one true fingertip included in the group consisting of the three or more fingers.

When the position data S10 indicating that four fingers are specified in the sensor unit 10 is acquired (ST80), the determination unit 82 calculates the finger distances D of the four fingers, and determines whether a longest distance among the calculated finger distances D is shorter than the second threshold value TH2 (ST85).

Figure 8:
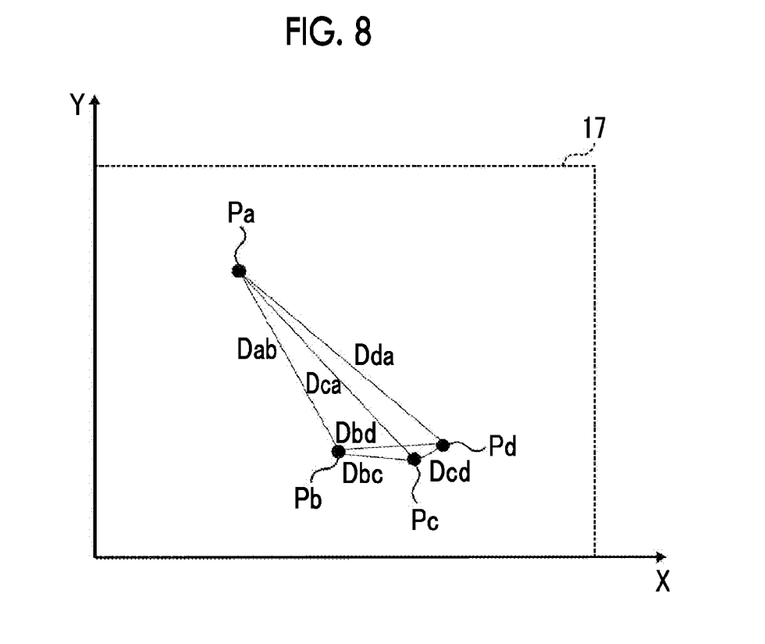
FIG. 8 is a diagram illustrating finger distances of the four fingers.

FIG. 8 is a diagram illustrating finger distances D of four fingers. "Pa," "Pb," "Pc," and "Pd" in FIG. 8 indicate the positions of fingers on the operation surface 17 specified by the sensor unit 10. In FIG. 8, a distance between the positions Pa and Pb is a finger distance Dab, a distance between the positions Pb and Pc is a finger distance Dbc, a distance between the positions Pc and Pa is a finger distance Dca, a distance between the positions Pb and Pd is a finger distance Dbd, a distance between the positions Pc and Pd is a finger distance Dcd, and a distance between the positions Pd and Pa is a finger distance Dda.

The determination unit 82 compares these finger distances Dab, Dbc, Dca, Dbd, Dcd, and Dda with the second threshold value TH2 in step ST45. When there is the finger distance exceeding the second threshold value TH2 as a result of the comparison, the determination unit 82 proceeds to step ST90 since the non-fingertip is likely to be included in a group consisting of the four fingers Pa, Pb, Pc, and Pd specified by the sensor unit 10. On the other hand, when all the finger distances are smaller than the second threshold value TH2 (that is, when the four fingers gather in a relatively small range), the determination unit 82 determines that the non-fingertip is unlikely to be included in a group consisting of the four fingers Pa, Pb, Pc and Pd and proceeds to a gesture standby mode (ST35).

In step ST90, the determination unit 82 calculates a size of the variation for the finger distance of the four fingers (Dab, Dbc, Dca, Dbd, Dcd, and Dda), and determines whether the size of the variation exceeds the first threshold value TH1. Specifically, the determination unit 82 calculates (15) differences between two of all the finger distances in the six finger distances and compares the calculated difference with the first threshold value TH1. Also, when at least one of the calculated differences exceeds the first threshold value TH1 (that is, when there is a finger greatly distant relative to other fingers), the determination unit 82 proceeds to step ST95 since the non-fingertip is likely to be included in a group consisting of the four fingers Pa, Pb, Pc, and Pd. On the other hand, when all the calculated differences are smaller than the first threshold value TH1, the determination unit 82 determines that the non-fingertip is unlikely to be included in the group consisting of the four fingers Pa, Pb, Pc, and Pd, and proceeds to the gesture standby mode (ST35).

In step ST95, the determination unit 82 calculates a predetermined evaluation value indicating a degree of the finger arrangement pattern of the four fingers Pa, Pb, Pc, and Pd approximating to the straight line, and determines whether the evaluation value is included in a predetermined range indicating the finger arrangement pattern is close to the straight line.

Figure 9:
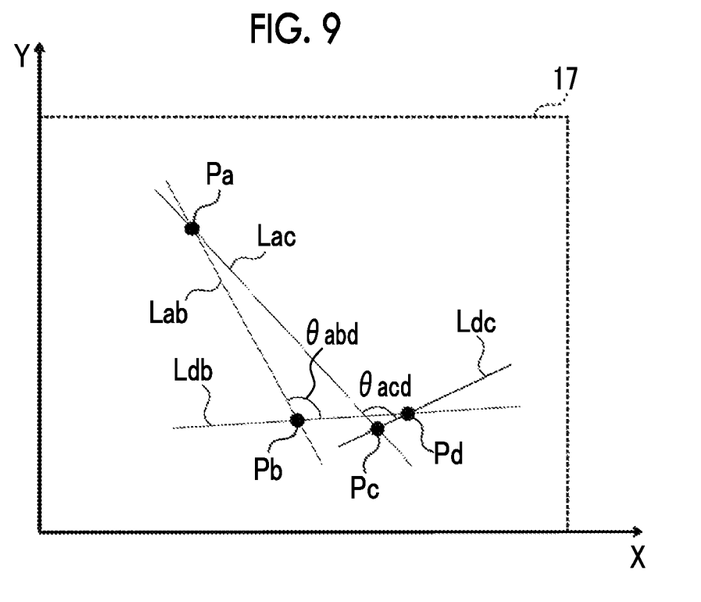
FIG. 9 is a diagram illustrating an evaluation value indicating a degree of a finger arrangement pattern of the four fingers approximating to a straight line.

FIG. 9 is a diagram illustrating an evaluation value indicating a degree of a finger arrangement pattern of the four fingers approximating to a straight line. As illustrated in FIG. 9, when four fingers Pa, Pb, Pc, and Pd are specified, the determination unit 82 calculates an evaluation value ($|180-\theta abd|$) according to an angle $\theta abd$ formed by two straight lines Lab and Ldb passing through respective positions Pa and Pd of the two most distant fingers and the position Pb of the other finger among the four fingers Pa, Pb, Pc, and Pd. Further, the determination unit 82 also calculates an evaluation value ($|180-\theta acd|$) according to an angle $\theta acd$ formed by two straight lines Lac and Ldc passing through the respective positions Pa and Pd of the two most distant fingers and the position Pc of the other finger.

When any one of the two calculated evaluation values is greater than the predetermined threshold value (angle), the determination unit 82 determines that the finger arrangement pattern of the four fingers Pa, Pb, Pc, and Pd deviates from a linear pattern. When the finger arrangement pattern deviates from the linear pattern, a non-fingertip is likely to be included in a group consisting of the four fingers Pa, Pb, Pc, and Pd, and thus, the determination unit 82 proceeds to step ST100. On the other hand, when the two calculated evaluation values are both smaller than the predetermined threshold value, the determination unit 82 determines that the non-fingertip is unlikely to be included in a group consisting of the four fingers Pa, Pb, Pc, and Pd, and proceeds to the gesture standby mode (ST35).

In step ST100, the determination unit 82 determines whether the non-fingertip is included in a group consisting of the four fingers based on the arrangement pattern of the four fingers Pa, Pb, Pc, and Pd and a position relative to the operation surface 17 of the operator.

Figure 10:
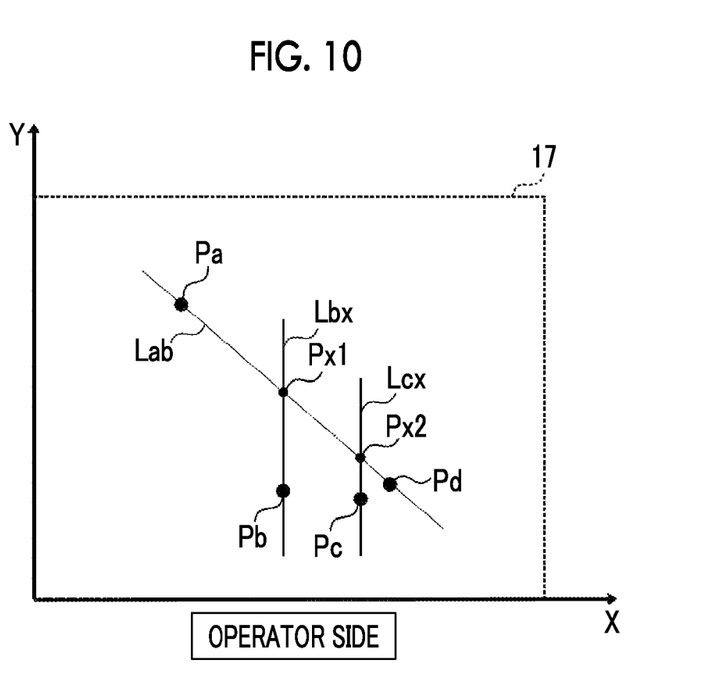
FIG. 10 is a diagram illustrating a method of determining whether there is a non-fingertip from a relationship between a finger arrangement pattern of the four fingers and a position of an operator.

FIG. 10 is a diagram illustrating a method of determining whether a non-fingertip is included in a group consisting of four fingers based on a finger arrangement pattern of the four fingers and a position of an operator.

Even in the example of FIG. 10, the operator is located at one side indicated as an "operator side" of an operation surface 17, as in FIG. 7. Further, a coordinate axis Y is set so that a coordinate value thereof indicates a distance from the operator. A straight line Lad is a straight line passing through positions Pa and Pd of two most distant fingers among four fingers Pa, Pb, Pc, and Pd. Further, a straight line Lbx is a straight line passing through a position Pb of one finger other than the two most distant fingers and being parallel to the Y axis. A straight line Lcx is a straight line passing through a position Pc of another finger other than the two most distant fingers and being parallel to the Y axis. An intersection point Px1 is an intersection point of the straight line Lad and the straight line Lbx. An intersection point Px2 is an intersection point of the straight line Lad and the straight line Lcx.

When the intersection point Px1 is in a position distant from the operator relative to the position Pb of the finger and the intersection point Px2 is in a position distant from the operator relative to the position Pc of the finger, the determination unit 82 determines that a non-fingertip is included in a group consisting of the four fingers. On the other hand, when the intersection point Px1 is in a position close to the operator relative to the position Pb of the finger or the intersection point Px2 is in a position close to the operator relative to the position Pc of the finger, the determination unit 82 determines that a non-fingertip is unlikely to be included in the group consisting of the four fingers Pa, Pb, Pc, and Pd, and proceeds to the gesture standby mode (ST35).

When the determination unit 82 determines that the non-fingertip is included in a group consisting of the four fingers in step ST100, the operation identification unit 81 proceeds to an expansion pointer mode (ST75).

When position data S10 indicating that five or more fingers are specified in the sensor unit 10 is acquired (ST80), the determination unit 82 sets a predetermined error flag indicating that the number of fingers exceeds the number of fingertips of which the operation can be identified (ST105).

As described above, according to the information processing device in this embodiment, the determination unit 82 determines whether the non-fingertip is included in the group consisting of the three or more fingers based on the relative position relationship among the three or more fingers when the positions of the three or more fingers are specified in the sensor unit 10. Also, when it is determined that the non-fingertip is included in the group consisting of the three or more fingers, the operation of one true fingertip included in the group consisting of the three or more fingers is identified by the operation identification unit 81.

Accordingly, even when an area of three or more objects coming into contact with or being in proximity to the operation surface 17 does not change with the fingertip, it is possible to appropriately determine that the non-fingertip is included in a group consisting of the three or more objects based on a relative position relationship between the objects. Further, even when it is determined that the non-fingertip not intended by the operator is included, the operation of one fingertip intended by the operator is identified by the operation identification unit 81, and thus, the operation of the one finger can continue without bothering with malfunction caused by unintentional contact of the non-fingertip (for example, a knuckle part).

Further, according to the information processing device in this embodiment, the distance (finger distance D) between each of the positions of the three or more fingers and the position of the other finger is calculated based on the positions of the three or more fingers specified in the sensor unit 10, and when the absolute value of the difference between one finger distance D and the other finger distance D that have been calculated (the size of the variation of the finger distance D) exceeds the first threshold value TH1, it is determined that the non-fingertip is included in the group consisting of the three or more fingers.

Accordingly, in the operation of one finger using the fingertip of the index finger or the like, it can be appropriately determined that joints or the like of the other fingers gathering in a position distant from the fingertip unintentionally comes in contact with or being in proximity to the operation surface 17.

Further, according to the information processing device in this embodiment, when at least one of the finger distances D calculated for the three or more fingers specified in the sensor unit 10 exceeds the second threshold value TH2, and the variation of the finger distance D exceeds the first threshold value TH1, it is determined that the non-fingertip is included in the group consisting of the three or more fingers.

Accordingly, when the positions of the three or more fingers are sufficiently close to one another, a state in which the joint of the other finger or the like unintentionally comes in contact with or is in proximity to the operation surface 17 at the time of an operation of one finger is not determined, and thus, the determination of the state can be accurately performed.

Further, according to the information processing device in this embodiment, the predetermined evaluation value indicating the degree of the arrangement pattern of the three or more fingers specified in the sensor unit 10 approximating to the straight line is calculated, and when the evaluation value deviates from the predetermined range indicating the finger arrangement pattern approximates to the straight line, it is determined that the non-fingertip is included in the group consisting of the three or more fingers.

Accordingly, when the arrangement pattern of the three or more fingers approximates to the straight line, the state in which the joint of the other finger or the like unintentionally comes in contact with or is in proximity to the operation surface 17 at the time of an operation of one finger is not determined, and thus, the determination of the state can be further accurately performed.

Further, according to the information processing device in this embodiment, it is determined whether the non-fingertip is included in the group consisting of the three or more fingers based on the position relationship relative to the operator between the straight line passing through the positions of the two most distant fingers among the three or more fingers specified in the sensor unit 10 and the position of the other finger.

Therefore, a state in which the joint of the other finger or the like unintentionally comes into contact with or is in proximity to the operation surface 17 at the time of an operation of one finger can be determined more accurately based on the position of the operator relative to the operation surface 17.

Further, the present invention is not limited to the above-described embodiment, and includes various variations.

In the above-described embodiment, since it is determined that the non-fingertip is included in a group consisting of three or more fingers specified by the sensor unit 10, four conditions are determined to be satisfied. In other words, when three fingers are specified in the sensor unit 10, four conditions of steps ST45, ST60, ST65, and ST70 are determined to be satisfied, and when four fingers are specified in the sensor unit 10, four conditions of steps ST85, ST90, ST95, and ST100 are determined to be satisfied. However, in the other embodiment of the present invention, an arbitrary condition among the four conditions may be omitted so that the embodiment is suitable for any application form. Further, a determination order of the four conditions may be arbitrarily changed.

In the above-described embodiment, the example in which the operation identification unit 81 and the determination unit 82 are included in the control unit 80. In another embodiment of the present invention, at least one of the blocks may be mounted on the sensor control unit 15 of the sensor unit 10. Further, in still another embodiment of the present invention, at least some (for example, a function of specifying the position of the finger coming into contact with or in proximity to the operation surface 17 based on the detection data) of the functions of the sensor control unit 15 of the sensor unit 10 may be provided in the control unit 80.

In the above-described embodiment, while the determination unit 82 calculates the difference between the finger distances Dab and Dbc, the difference between the finger distances Dbc and Dca, and the difference between the finger distances Dac and Dab, and compares the calculated difference with the first threshold value TH1 to indirectly determine the size of the variation of the distance between adjacent fingers, the present invention is not limited thereto. In another embodiment of the present invention, the determination unit 82 may search for the next finger, that is, the closest finger, calculate the finger distance from the closest finger, and compare a difference between the two calculated fingers distances with the threshold value to directly determine the size of the variation of the distance between adjacent fingers.

It should be understood by those skilled in the art that various modifications, combinations, sub-combinations and alterations may occur depending on design requirements and other factors insofar as they are within the scope of the appended claims of the equivalents thereof.

What is claimed is:

1. An information processing device comprising:
    an operation surface on which a fingertip is operated by coming into contact therewith or being in proximity thereto;
    a sensor unit configured to detect a plurality of positions on the operation surface at which fingers of an operator are in contact therewith or in proximity thereto;
    a determination unit configured to determine, when three or more positions are detected by the sensor unit, if the three or more positions include a position of a non-fingertip based on positional relationships among the three or more positions; and
    an identification unit configured to identify an operation of one or more fingertips based on the three or more positions detected by the sensor unit and a determination result of the determination unit,
    wherein the determination unit calculates an evaluation value indicating a degree of an arrangement pattern of the three or more positions approximating to a straight line according to an angle formed by two straight lines each passing through respective one of two most distant positions and another position among the three or more positions, and determines that the three or more positions include the position of the non-fingertip when the calculated evaluation value deviates from a predetermined range of the evaluation value indicating that the arrangement pattern approximates to the straight line.

2. The information processing device according to claim 1,
    wherein the determination unit determines if the three or more positions include a position of the non-fingertip based on an extent of a variation in distances between adjacent positions among the three or more positions detected by the sensor unit.

3. The information processing device according to claim 1,
    wherein the determination unit calculates a distance between each of adjacent positions among the three or more positions detected by the sensor, and determines that the three or more positions include the position of the non-fingertip when an absolute value of a difference between two calculated distances exceeds a first threshold value.

4. The information processing device according to claim 1,
wherein the determination unit calculates a distance between each of adjacent positions among the three or more positions detected by the sensor unit, and determines that the three or more positions include the position of the non-fingertip when an absolute value of a difference between two calculated distances exceeds a first thresh hold value and at least one calculated distance exceeds a second threshold value.

5. An information processing device comprising:
an operation surface on which a fingertip is operated by coming into contact therewith or being in proximity thereto;
a sensor unit configured to detect a plurality of positions on the operation surface at which fingers of an operator are in contact therewith or in proximity thereto;
a determination unit configured to determine, when three or more positions are detected by the sensor unit, if the three or more positions include a position of a non-fingertip based on positional relationships among the three or more positions; and
an identification unit configured to identify an operation of one or more fingertips based on the three or more positions detected by the sensor unit and a determination result of the determination unit,
wherein the operation surface is provided with a coordinate axis having a coordinate value according to a distance from an operator side of the operation surface at which the operator is located, and
wherein the determination unit determines that the three or more positions include the position of the non-fingertip when an intersection point of a straight line passing through two most distant positions among the three or more positions and a straight line passing through another position among the three or more positions and being parallel to the coordinate axis is farther from the operator side than the another position.

6. A method of identifying an operation of a fingertip coming into contact with or being in proximity to an operation surface of an information processing device, the method comprising:
detecting, using a sensor, a plurality of positions on the operation surface at which fingers of an operator are in contact therewith or in proximity thereto;
determining, when three or more positions are detected by the sensor, if the three or more positions include a position of a non-fingertip based on positional relationships among the three or more positions; and
identifying an operation of one or more fingertips based on the three or more positions detected by the sensor and a determination result of the non-fingertip,
wherein the determining includes:
calculating an evaluation value indicating a degree of an arrangement pattern of the three or more positions approximating to a straight line, according to an angle formed by two straight lines each passing through respective one of two most distant positions and another position among the three or more positions; and
determining that the three or more positions include the position of the non-fingertip when the calculated evaluation value deviates from a predetermined range of the evaluation value indicating that the arrangement pattern approximates to the straight line.

7. The method of identifying an operation of a fingertip according to claim 6,
wherein the determining is based on an extent of a variation in distances between adjacent positions among the three or more positions detected by the sensor.

8. The method of identifying an operation of a fingertip according to claim 6, wherein the determining includes:
calculating a distance between each of adjacent positions among of the three or more positions detected by the sensor; and
determining that the three or more positions include the position of the non-fingertip when an absolute value of a difference between two calculated distances exceeds a first threshold value.

9. The method of identifying an operation of a fingertip according to claim 6, wherein the determining includes:
calculating a distance between each of adjacent positions among the three or more positions detected by the sensor; and
determining that the tree or more position include the position of the non-fingertip when an absolute value of a difference between two calculated distances exceeds a first threshold value, and at least calculated distance exceeds a second threshold value.

10. A method of identifying an operation of a fingertip coming into contact with or being in proximity to an operation surface of an information processing device, the method comprising:
detecting, using a sensor, a plurality of positions on the operation surface at which fingers of an operator are in contact therewith or in proximity thereto;
determining, when three or more positions are detected by the sensor, if the three or more positions include a position of a non-fingertip based on positional relationships among the three or more positions; and
identifying an operation of one or more fingertips based on the three or more positions detected by the sensor and a determination result of the non-fingertip,
wherein the operation surface is provides with a coordinate axis having a coordinate value according to a distance from an operator side of the operation surface at which the operator is located, and
wherein the determining determines that the three or more positions include the position of the non-fingertip when an intersection point of a straight line passing through two most distant positions among the three or more positions and a straight line passing through another position among the three or more positions and being parallel to the coordinate axis is farther from the operator side than the another position.

11. A computer-readable, non-transitory recording medium storing a computer program for causing a computer to execute the method of identifying an operation of a fingertip according to claim 6.

12. The information processing device according to claim 5,
wherein the determination unit determines if the three or more positions include a position of the non-fingertip based on an extent of a variation in distances between adjacent positions among the three or more positions detected by the sensor unit.

13. The information processing device according to claim 5, wherein the determination unit calculates a distance between each of adjacent positions among the three or more positions detected by the sensor, and determines that the three or more positions include the position of the non-fingertip when an absolute value of a difference between two calculated distances exceeds a first threshold value.

14. The information processing device according to claim 5, wherein the determination unit calculates a distance between each of adjacent positions among the three or more positions detected by the sensor unit, and determines that the three or more positions include the position of the non-fingertip when an absolute value of a difference between two calculated distances exceeds a first thresh hold value and at least one calculated distance exceeds a second threshold value.

15. The method of identifying an operation of a fingertip according to claim 10, wherein the determining is based on an extent of a variation in distances between adjacent positions among the three or more positions detected by the sensor.

16. The method of identifying an operation of a fingertip according to claim 10, wherein the determining includes:
   calculating a distance between each of adjacent positions among of the three or more positions detected by the sensor; and
   determining that the three or more positions include the position of the non-fingertip when an absolute value of a difference between two calculated distances exceeds a first threshold value.

17. The method of identifying an operation of a fingertip according to claim 10, wherein the determining includes:
   calculating a distance between each of adjacent positions among the three or more positions detected by the sensor; and
   determining that the tree or more position include the position of the non-fingertip when an absolute value of a difference between two calculated distances exceeds a first threshold value, and at least calculated distance exceeds a second threshold value.

* * * * *